(12) United States Patent
Yang et al.

(10) Patent No.: US 10,228,389 B2
(45) Date of Patent: Mar. 12, 2019

(54) METHOD AND APPARATUS FOR INFRARED SCATTERING SCANNING NEAR-FIELD OPTICAL MICROSCOPY WITH BACKGROUND SUPPRESSION

(71) Applicant: Bruker Nano, Inc., Santa Barbara, CA (US)

(72) Inventors: Honghua Yang, Santa Barbara, CA (US); Craig Prater, Santa Barbara, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 14/957,480

(22) Filed: Dec. 2, 2015

(65) Prior Publication Data

US 2017/0160309 A1    Jun. 8, 2017

(51) Int. Cl.
*G01Q 30/02* (2010.01)
*G01Q 20/02* (2010.01)
*G01Q 60/06* (2010.01)

(52) U.S. Cl.
CPC ........... *G01Q 30/025* (2013.01); *G01Q 20/02* (2013.01); *G01Q 60/06* (2013.01)

(58) Field of Classification Search
USPC ..................... 820/9; 850/9, 33, 62
See application file for complete search history.

(56) References Cited

U.S. PATENT DOCUMENTS

| | | | |
|---|---|---|---|
| 6,545,276 B1 | 4/2003 | Sasaki | |
| 6,858,436 B2 | 2/2005 | Zenhausern et al. | |
| 7,276,902 B1 | 10/2007 | Xiang et al. | |
| 7,414,731 B2 | 8/2008 | Chu et al. | |
| 7,738,115 B2* | 6/2010 | Ocelic | B82Y 20/00 356/501 |
| 7,977,636 B2 | 7/2011 | Raschke et al. | |
| 8,115,934 B2* | 2/2012 | Boppart | A61B 5/0066 356/479 |
| 8,209,767 B1 | 6/2012 | Manassen et al. | |
| 8,646,110 B1 | 2/2014 | Xu | |
| 8,793,811 B1* | 7/2014 | Prater | G01Q 20/02 73/105 |
| 8,832,861 B2 | 9/2014 | Ocelic | |
| 8,881,311 B2 | 11/2014 | Raschke et al. | |
| 9,043,946 B2 | 5/2015 | Ocelic et al. | |
| 9,052,336 B2 | 6/2015 | Raschke et al. | |
| 9,313,423 B2* | 4/2016 | Wang | H04N 5/30 |
| 2013/0145505 A1 | 6/2013 | Ocelic | |
| 2015/0028210 A1 | 1/2015 | Han et al. | |
| 2015/0077819 A1 | 3/2015 | Schnell et al. | |
| 2015/0089694 A1 | 3/2015 | Ocelic et al. | |

FOREIGN PATENT DOCUMENTS

| | | |
|---|---|---|
| EP | 2613159 A1 | 7/2013 |
| WO | WO2014051680 A1 | 4/2014 |

OTHER PUBLICATIONS

Amenabar et al., Structural analysis and mapping of individual protein complexes by infrared nanospectroscopy. Nat Commun, 2013. 4.
Govyadinov, A.A., et al., Quantitative Measurement of Local Infrared Absorption and Dielectric Function with Tip Enhanced Near-Field Microscopy. The Journal of Physical Chemistry Letters, 2013. 4(9): p. 1526-1531.
Huth, F., et al., Infrared-spectroscopic nanoimaging with a thermal source. Nat Mater, 2011. 10(5): p. 352-356.
Huber, A.J., et al., Infrared nanoscopy of strained semiconductors. Nat Nano, 2009. 4(3): p. 153-157.
Cvitkovic, A., N. Ocelic, and R. Hillenbrand, Material-Specific Infrared Recognition of Single Sub-10 nm Particles by Substrate-Enhanced Scattering-Type Near-Field Microscopy. Nano Letters, 2007. 7(10): p. 3177-3181.
Brehm, M., et al., Infrared Spectroscopic Mapping of Single Nanoparticles and Viruses at Nanoscale Resolution. Nano Letters, 2006. 6(7): p. 1307-1310.
Ocelic, N., A. et al, Pseudoheterodyne detection for background-free near-field spectroscopy. Applied Physics Letters, 2006. 89(10): p. 101124.
Taubner, T. et al, Nanoscale polymer recognition by spectral signature in scattering infrared near-field microscopy. Applied Physics Letters, 2004. 85(21): p. 5064-5066.
Xu, X.G., et al, Phase stabilized homodyne of infrared scattering type scanning near-field optical microscopy. Applied Physics Letters, 2014. 105(26): p. 263104.
Gerber, J.A., et al., Phase-Resolved Surface Plasmon Interferometry of Graphene. Physical Review Letters, 2014. 113(5): p. 055502.
Bechtel, H.A., et al., Ultrabroadband infrared nanospectroscopic imaging. Proceedings of the National Academy of Sciences, 2014. 111(20): p. 7191-7196.
Pollard, B., et al., Vibrational nano-spectroscopic imaging correlating structure with intermolecular coupling and dynamics. Nat Commun, 2014. 5.
Berweger, S., et al., Nano-Chemical Infrared Imaging of Membrane Proteins in Lipid Bilayers. Journal of the American Chemical Society, 2013. 135(49): p. 18292-18295.
Xu, X.G., et al., Pushing the Sample-Size Limit of Infrared Vibrational Nanospectroscopy: From Monolayer toward Single Molecule Sensitivity. The Journal of Physical Chemistry Letters, 2012. 3(13): p. 1836-1841.

(Continued)

*Primary Examiner* — Phillip A Johnston
(74) *Attorney, Agent, or Firm* — Boyle Fredrickson S.C.

(57) ABSTRACT

System and method for measuring an optical property of a sub micrometer region of a sample including interacting a probe tip of a probe microscope with a region of the sample, illuminating the sample with a beam of light from a radiation source such that light is scattered from the probe-sample interaction region, interfering a reference beam with the scattered light wherein the reference beam has an adjustable optical phase, measuring with a detector at least a portion of the light scattered from probe-sample and background regions at a substantially constant reference phase, and constructing a signal indicative of the optical property of the sample wherein contributions from background scattered light are substantially suppressed.

24 Claims, 7 Drawing Sheets

(56) References Cited

OTHER PUBLICATIONS

Schnell, M. et al. Synthetic optical holography for rapid nanoimaging. Nature Communications 2013 5(3444): p. 1-10.
Deutsch, B. et al. Near-field amplitude and phase recovery using phase-shifting interferometery. Optics Express 2008 16(2): p. 494-501.

* cited by examiner

Figure 1B
Inset

Point B

Set the reference mirror position

Laser wavenumber = 1667 cm$^{-1}$ image 1 (containing background)

Figure 5A image 2 (background image)

Figure 5B image 3 = image 1 – image2

AFM measured topography

SNOM absorption without background   SNOM absorption containing background 1667 cm⁻¹

METHOD AND APPARATUS FOR INFRARED SCATTERING SCANNING NEAR-FIELD OPTICAL MICROSCOPY WITH BACKGROUND SUPPRESSION

The specification relates to scattering Scanning Near Field Optical Microscopy (s-SNOM) and in particular to Infrared (IR) s-SNOM for acquiring information indicative of the optical properties and/or material composition of a surface with background effects suppressed.

s-SNOM and in particular s-SNOM performed in the IR may be a useful technique for measuring and mapping optical properties/material composition of some surfaces with resolution approaching nanometer scale. Various aspects of the technique are described in U.S. application Ser. Nos. 13/835,312, 14/322,768, and 14/634,859 by common inventors and commonly owned with this application. These applications are incorporated by reference in their entirety.

BRIEF DESCRIPTION

In some embodiments, systems and methods may be provided that suppress the background scattering contribution to s-SNOM measurements acquired with an interferometer having a reference arm and a sample illumination arm set up to interfere with each other. The probe-sample area is illuminated by a light source. In some embodiments the light source may be tunable allowing for the illumination to occur at a plurality of selected wavelengths, one wavelength at a time. Uncontrolled background scattered light can dramatically compromise the accuracy of nanoscale optical property measurements. In some embodiments the background may be determined separately from the probe-sample interaction signal by making measurements without the reference arm active. A suitable substantially constant reference phase may be determined, which in some embodiments may be accomplished by determining a reference phase (for example a reference mirror position) for use at a plurality of probe positions on the sample. Rapid measurements sensitive to the optical properties/material composition in the area immediately under the tip may then be made at the substantially constant reference phase. Some embodiments may include capturing detector signals with no reference beam and constructing the suppressed background signal by comparing the signal at the predetermined reference phase with the signal captured with no reference beam. The measurements may be repeated at a plurality of illumination wavelengths and/or at a plurality of sample positions.

In some embodiments, a method may be provided measuring an optical property of a sub micrometer region of a sample including interacting a probe tip of a probe microscope with a region of the sample, illuminating the sample with a beam of light from a radiation source such that light is scattered from the probe-sample interaction region, interfering a reference beam with the scattered light wherein the reference beam has an adjustable optical phase, measuring with a detector at least a portion of the light scattered from probe-sample and background regions at a substantially constant reference phase, and constructing a signal indicative of the optical property of the sample wherein contributions from background scattered light are substantially suppressed.

Some embodiments may include measuring detector signals with no reference beam interference.

Some embodiments may include repeating some or all steps at a plurality of probe positions on the sample Some embodiments may include measuring an amplitude of light collected by the detector as a function of adjustable reference phase to create an interferogram and using the interferogram to select the substantially constant reference phase.

In some embodiments, the reference phase may be selected to be a value of the adjustable phase wherein the interferogram amplitude substantially corresponds to a background amplitude of scattered light measured without a reference beam present.

In some embodiments, the reference phase may be selected to be a value of the adjustable phase wherein the interferogram amplitude substantially corresponds to a midpoint between maximum and minimum values of the interferogram.

In some embodiments, the reference phase may be selected to be a value of the adjustable phase wherein the interferogram amplitude substantially corresponds to an average value of the interferogram over an integral number of interferogram periods.

In some embodiments the reference phase may be selected to be a value of the adjustable phase wherein the interferogram has substantially a maximum slope.

In some embodiments, the reference phase may be selected to have a value substantially equal to $(2m+1)\pi/2$ where m is an integer.

In some embodiments the reference phase may be selected to have a value substantially equal to $m\pi$ where m is an integer.

In some embodiments the reference phase may be measured on a reference region of a sample, wherein the reference region has a known or substantially constant scattering response.

In some embodiments the reference region may be within a positionable range of the probe.

Some embodiments may include of capturing detector signals with no reference beam and constructing the suppressed background signal by comparing the signal at the substantially constant reference phase with the detector signals captured with no reference beam.

In some embodiments a background suppressed image of an optical property of the sample may be created by subtracting amplitudes of detector signals obtained with no reference beam from amplitudes of detector signals obtained with the reference beam at the substantially constant reference phase.

Some embodiments may include performing some or all steps at a plurality of source wavelengths.

In some embodiments the optical property may include at least one of absorption, reflection, real/imaginary index of refraction (n,k), real/imaginary dielectric constant, real/imaginary permittivity, and real/imaginary polarizability.

In some embodiments a method of measuring an optical property of a sub micrometer region of a sample may be provided including interacting a probe tip of the probe microscope with a region of the sample, illuminating the sample with a beam of light from a radiation source such that light is scattered from the probe-sample interaction region and also scattered from background regions, interfering a reference beam with the probe-sample and background scattered light wherein the reference beam has an adjustable optical phase, measuring with a detector at least a portion of the light scattered from probe-sample and background regions at a substantially constant value corresponding to the reference phase, creating an interferogram of an amplitude of detector signals as a function of optical phase to determine a reference phase, measuring detector signals with no reference beam, and comparing the detector signals with the reference beam at the reference phase with detector signals with no reference beam to construct a signal indicative of the optical property of the sample wherein contributions from the background scattered light are suppressed.

Some embodiments may include repeating some or all steps at a plurality of probe positions on the sample to construct an image of the optical property.

In some embodiments a sample analysis system may be provided including a probe microscope with a probe tip configured to interact with a region of the sample, a radiation source configured to illuminate a region of the sample in the vicinity of the probe tip, an interferometer for interfering light scattered from the illuminated tip region with a reference beam of adjustable optical phase, a detector to measure at least a portion of the scattered light scattered from the probe sample interaction region, wherein said system is configured to construct a signal indicative of an optical property of the sample wherein contributions from background scattered light are substantially suppressed.

In some embodiments the detector is configured to measure tip-sample scattered light with no reference beam interference.

In some embodiments the system is configured to move the reference mirror, in a pattern to create an interferogram covering at least one full phase cycle and capturing the detector signal representative of the interferogram, capture the background signal with the reference beam removed, determine the reference mirror position (phase) where the interferogram intersects, on the rise, the background signal, and use that reference mirror position as the substantially constant reference phase.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

One or more embodiments described herein may provide rapid material characterization of a sample surface via measurements of a sample with optical property/material composition resolution approaching or at nanometer scale using an s-SNOM.

One or more embodiments described herein may provide rapid material characterization of a sample surface with optical property/material composition resolution approaching or at nanometer scale using an s-SNOM for material suitable for characterization with IR spectroscopy.

One or more embodiments described herein may provide rapid optical property/material composition sensitive imaging of some sample surfaces.

One or more embodiments described herein may provide, for improved accuracy s-SNOM surface characterization by suppressing the background contribution in a scanning probe based s-SNOM system.

An s-SNOM system may include a Scanning Probe Microscope (SPM) which may be an Atomic Force Microscope (AFM). An SPM may include a probe which may be cantilever probe with a sharp tip. Cantilever probes are generally microfabricated cantilevers made from silicon, silicon nitride or other semiconductor based materials. Probes have also been fabricated from metals and polymeric materials. In general the probe only needs to have a sharp tip that can interact with the sample and support for some mechanism to detect the interaction, e.g. by the bending of the cantilever probe, or the change in resistance, resonance frequency or other property that is indicative of the interaction between the probe time and the sample. The interaction may be contact, non-contact, intermittent contact, tapping and/or any other method by which the probe tip is moved in close proximity with the sample surface and creates an interaction that can be observed and/or has an impact on an observable property of the probe. One or more scanning mechanisms (or scanners) is used to generate relative translation between the probe and the sample so that the probe can interact with and measure properties of a plurality of positions on a sample. The scanning mechanism can move either the probe, the sample or a combination thereof. The scanning mechanisms are usually piezoelectric devices, but can also employ other mechanisms like electromagnetic, electrostatic, electrostictive and other drive mechanisms that induce a desired motion in response to a given control signal or command. Scanners include, but are not limited to piezoelectric tubes, piezoelectric stacks, piezoelectric driven flexure stages, voice coils, and other mechanisms for providing precision translation. The SPM generally include a capability for measuring the motion, position and or other response of the probe tip and/or an object to which the probe tip is attached, e.g. a cantilever or a tuning fork or MEMS device, for example. The most common method includes using an optical lever system where a laser beam is bounced off the cantilever probe to measure deflection of the cantilever. Alternatives include self-sensing techniques like piezoresistive cantilevers, tuning forks, capacitive sensing and other techniques.

The s-SNOM system and methods also may include a variety of optical elements to enable illumination of the tip-sample region and collection of scattered light. Illumination of the tip-sample region means to arrange for light from a light source to be incident on a region of a sample where the tip interacts with the sample surface. In general the light is focused to a spot, although in general the focused light spot is much larger than the tip-sample interaction region. The light, however, is often "nanofocused" and/or intensified by the probe tip geometry and/or surface coating. Light sources may include a wide variety of lasers, including but not limited to diode lasers, gas lasers, quantum cascade lasers, optical parametric oscillators, optical parametric generators, nanosecond, picosecond and femtosecond lasers, frequency combs, second harmonic generators and other lasers. It may also include thermal sources such as globars and additionally institutional sources like synchrotrons and free electron lasers. The s-SNOM system may include optics for directing light from one or more of the sources towards to probe tip and the tip-sample interaction region. These optics may include any number of lenses, mirrors, attenuators, polarizers, beam steering elements to direct and condition the beam prior to arriving at the tip sample region. The beam will generally be focused to a spot in the vicinity of the tip sample region. The focusing optic may include lenses and or reflective focusing elements, for example parabolic mirrors, including off axis parabolic mirrors. The s-SNOM system also may include collection optics to collect light scattered from the sample. These optics may be the same as optics used to deliver light to the tip, but may also be an alternative set of optics. The s-SNOM system may also include an interferometer to provide amplification and/or phase sensitive measurements. The interferometer may include a beamsplitter to split the light from the source along two paths. The beamsplitter can be a simple flat window, a wedged window, and/or either of these elements with coatings to improve performance. For example the beamsplitter may have a partially reflective coating on one surface and an antireflective coating on the other surface. The interferometer may also include a compensator plate to compensate for the finite thickness of the beamsplitter. The material of the beamsplitter may be selected to be optimal for the wavelength range of the source. It may be made for example of glass, quartz, silicon, germanium, KBr, KCl, ZnSe, ZnS, $BaF_2$, $CaF_2$ or other materials. The s-SNOM system may also include a detector to detect light scattered from the sample and/or reflected through the interferometer. The detector may be any number of optical detectors, including visible/UV/near-IR photodiodes, infrared detectors including mercury cadmium telluride detectors (MCT) deuterated triglycine sulfate (DTGS), pyroelectric detectors, bolometers, avalanche photodiodes or any other optical detector that can detect light and produce a corresponding output signal. The interferometer may be used to measure the optical properties of interfering light beam from the sample and from a reference arm. "Interfering" in this case means that the two beams are at least partially spatially overlapped at a detector. For coherent light sources an indication of interference is that if the phase of one of the light beams is adjusted it will cause a modulation of the intensity of the light at the detector as the two interfering beams go in and out of constructive and destructive interference.

The s-SNOM system and methods may include control elements or controller to facilitate data acquisition and control of the s-SNOM system. The controller may be a single integrated electronic enclosure or may comprise multiple distributed elements. The control elements may provide control for positioning and/or scanning of the probe tip and/or sample. They may also collect data about the probe deflection, motion or other response, measure the response of the optical detector, provide control over the radiation source power, polarization, steering, focus and/or other functions. The control elements etc. may include a computer program method or a digital logic method and may be implemented using any combination of a variety of computing devices (computers, Personal Electronic Devices), analog and/or digital discrete circuit components (transistors, resistors, capacitors, inductors, diodes, etc.), programmable logic, microprocessors, microcontrollers, application-specific integrated circuits, or other circuit elements. A memory configured to store computer programs and may be implemented along with discrete circuit components to carry out one or more of the processes described herein.

Scattering scanning near field optical microscopy (s-SNOM) operates by interacting a sharp probe tip of a probe microscope with a sample surface and collecting light scattered from the region of tip-sample interaction. Using this technique it is possible to measure the optical properties of samples with a spatial resolution far below the conventional diffraction limits. The resolution improvement comes from a local enhancement of the incident radiation field due to the sharp tip. The enhanced radiation field interacts with the sample and then scatters radiation into the far field. This near-field enhancement increases the amount of radiation scattered from the tip-sample region such that the scattered radiation can be more easily detected.

Figures 1A, 1B:
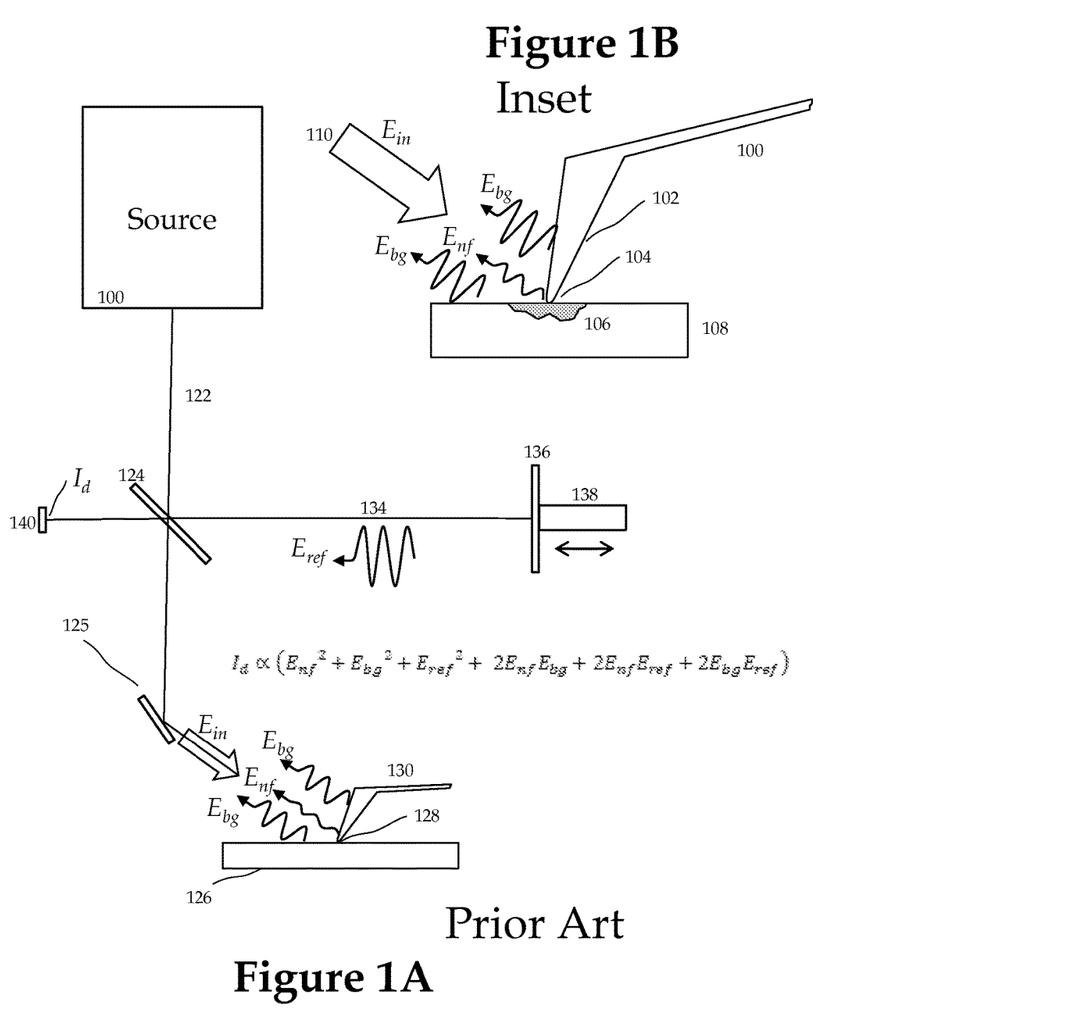
FIGS. 1A and 1B are block diagrams of an interferometer/probe microscope s-SNOM system, according to an illustrative embodiment.

Referring to FIG. 1B, a probe 100 with a sharp tip 104 is interacted with a region of interest 106 of a sample 108. Light 110 with electric field intensity $E_{in}$ is incident on the surface of a sample 108. The incident radiation field is enhanced in the region of the tip apex 104, leading to light scattered from the region of tip-sample interaction with electric field intensity $E_{nf}$. It is the goal of an s-SNOM system to detect this scattered near field radiation $E_{nf}$. Unfortunately, the incident radiation $E_{in}$ also interacts with regions of the probe tip 102 that are away from the tip apex 104 and also with regions of the sample 108 that are away from the tip apex and even away from the region of interest 106. These unwanted interactions result in large background scattering $E_{bg}$. In practice, the background scattered field can be orders of magnitude larger than the tip apex scattered field $E_{nf}$. For this reason it may be desirable to discriminate between light scattered from the tip apex region versus scattered from other sources. The probe tip may in some embodiments be the probe tip of a Scanning Probe Microscope (SPM), or a subsystem of an SPM, and in particular embodiments the probe tip of an Atomic Force Microscope (AFM) or AFM subsystem.

One technique that may have beneficial impact on increasing signal to noise is to use interfereometric techniques. These interferometric techniques are shown generically and schematically in FIG. 1A. Light 122 from a light source 120 is directed through a beam splitter 124 to a sample 126 near the end 128 of probe 130. As indicated in prior description of FIG. 1B, the light incident on the probe and sample, results in light scattered both from the region of interest ($E_{nf}$) and from background sources ($E_{bg}$). This scattered light can be directed back to the beam splitter 124 and then focused on a detector 140. Other interferometric techniques include directing a portion 134 of the incident beam at the beam splitter 124 to a reference mirror 136 and then interfering the reference beam with the sample scattered light at the detector 140. An actuator 138 may be used to adjust the reference phase. The actuator may be any of a large variety of actuators including a piezo stage, a linear motor, a voice coil and/or other devices that provide predictable translation. The actuator ideally has a travel range of at least 0.5 cm, to support an optical path difference of 1 cm, i.e. twice the mirror travel range. This achieves a spectral resolution of 1 $cm^{-1}$, the reciprocal of the optical path difference range. The adjustable phase actuator should also preferably move predictably with high linearity and substantially constant velocity while interferometric measurements are being performed. The phase actuator should also preferably support a large dynamic range, including velocities as slow as 0.3 um/sec up to velocities as fast as 1 mm/sec or higher. This interferometric scheme is employed for three main purposes: (1) To provide wavelength sensitive measurements with broadband radiation sources, as commonly performed with Fourier Transform Infrared (FTIR) spectroscopy; (2) to provide amplification for the weak tip-scattered field $E_{nf}$; (3) to provide separate measurements of the optical amplitude and phase.

We next consider the signal measured at the detector 140. The total electric field $\tilde{E}_{tot}$, at the detector is given by:

$$\tilde{E}_{tot} = \tilde{E}_{nf} + \tilde{E}_{bg} + \tilde{E}_{ref}$$

where each of these quantities are complex, to account for phase differences between the electric field components. Note that for simplicity, all collection efficiency factors and optical losses are being subsumed into the electric field strengths, i.e., these are the electric field strengths at the detector surface, not at the sources. The light intensity at the detector is proportional to $|\tilde{E}_{tot}|^2$, thus:

$$I_d \propto (|\tilde{E}_{nf}|^2 + |\tilde{E}_{bg}|^2 + |\tilde{E}_{ref}|^2) + \text{Real}(2\tilde{E}_{nf}\tilde{E}^*_{bg} + 2\tilde{E}_{nf}\tilde{E}^*_{ref} + 2\tilde{E}_{bg}\tilde{E}^*_{ref})$$

One technique that is used to improve signal quality in interferometric s-SNOM systems is to modulate the probe tip of the SPM, at a frequency $f_0$, usually (but not necessarily) in a frequency range 50-500 kHz, and then make probe signal measurements in a narrow frequency range corresponding to a harmonic of $f_0$. This technique may have the benefit of simplifying the intensity equation above. For instance, for some SPM based s-SNOM systems, using the third harmonic has the effect of minimizing all but two terms of the intensity equation leaving:

$$I_{\omega 3} \propto (2E_{nf}E_{bg}\cos(\varphi_{nf} - \varphi_{bg}) + 2E_{nf}E_{ref}\cos(\varphi_{nf} - \varphi_{ref}))$$

Where $\varphi_{nf}$ is the scattering tip signal phase, $\varphi_{bg}$ is the background scattering signal phase, and $\varphi_{ref}$ is the interferometer reference phase, typically the position of the reference mirror position. In the equation above, the coefficient $En_f$, $E_{bg}$ and $E_{ref}$ are now real, scalar values and their complex nature is represented by the associated phases $\varphi_{nf}$, $\varphi_{bg}$, and $\varphi_{ref}$.

Figure 2:
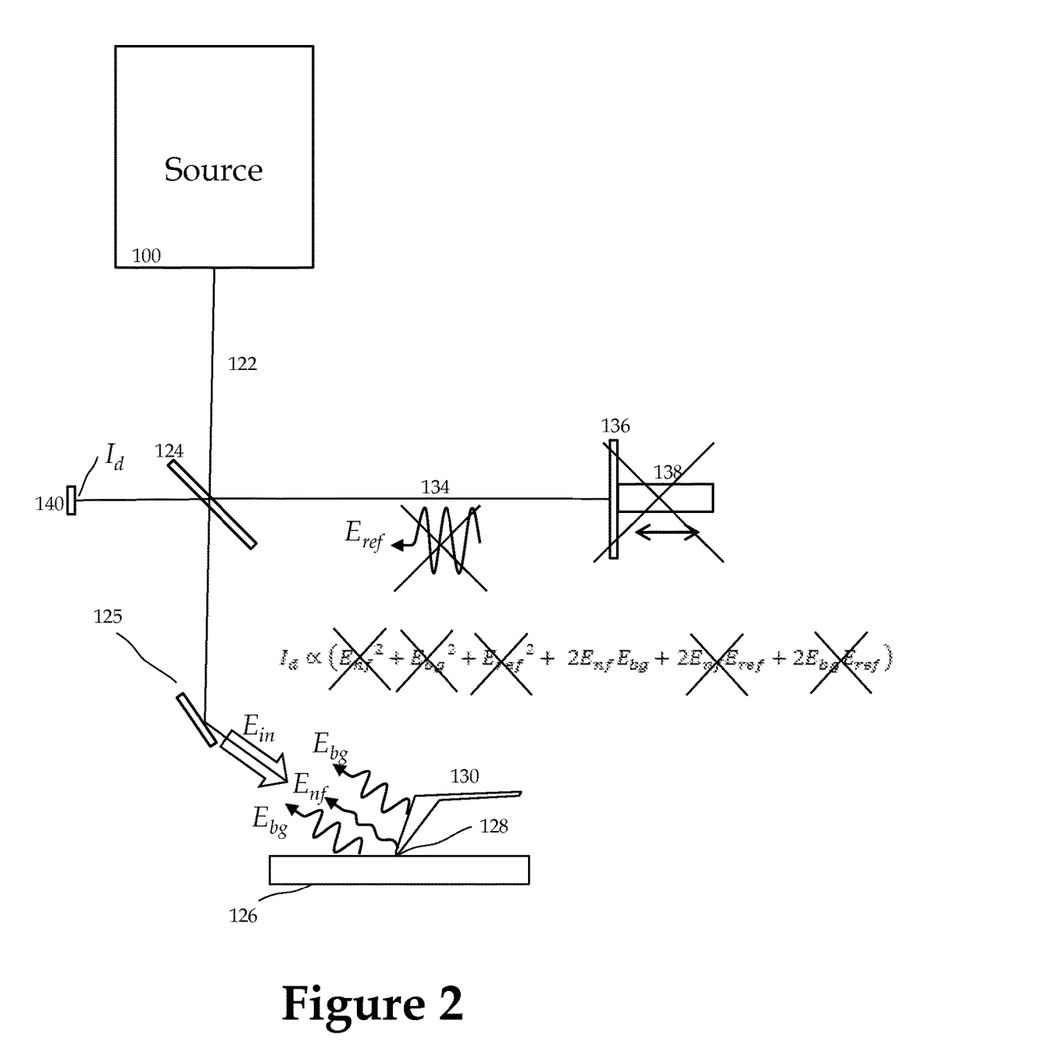
FIG. 2 is a block diagram of an interferometer/probe microscope s-SNOM system with the reference arm inactive, according to an illustrative embodiment.

We will now turn to these phase terms. The nearfield phase $\varphi_{nf}$ contains specific information about the optical properties of sub-micron regions of the sample. As such it is desirable to perform an accurate measurement of this quantity. The reference phase $\varphi_{ref}$ is an adjustable phase that can be adjusted by actuator 138 or by other equivalent means. The background phase $\varphi_{bg}$, however, is unknown and uncontrolled. This term can introduce substantial errors in measurements of the sample properties, Attempts to compensate for this unknown background phase have included modulation of the reference phase while imaging nearfield response and a complex demodulation scheme. Current embodiments do not require reference phase modulation during measurement and thus do not require complex demodulation and additionally may enable measurements of optical properties of submicron regions of the sample at a plurality of positions while the reference phase is maintained substantially constant. This simplifies the demodulation scheme substantially and may improve measurement speed and bandwidth. These benefits are achieved in some embodiments with a two-step process. One step includes a measurement of the scattered light measurement and is performed with the reference arm blocked or the reference arm otherwise removed. This allows for a measurement to reduce or eliminate the background scattering effect on measurements. Note in FIG. 2, if the reference arm is removed, which may be accomplished by rotating or removing the reference mirror 136 from the optical path or otherwise blocking the reference beam. In this case the only term remaining at the third tip oscillation harmonic will be the crossterm between the scattered near field and the background term, i.e $2E_{nf}E_{bg}\cos(\varphi_{nf} - \varphi_{bg})$ Thus it is possible to separately measure the background crossterm and use this information to construct a more accurate measurement of the near-field scattered light.

Once the background crossterm is known, it can be subtracted from a measurement obtained with the reference light beam present. The resulting difference is the term: $2E_{nf}E_{ref}\cos(\varphi_{nf} - \varphi_{ref})$, a term that is free of dependence on the background amplitude and phase. Since the reference beam amplitude $E_{ref}$ and phase $\varphi_{ref}$ are controllable, these can be selected in a way to obtain desired measurements optical properties of the sample via measurements of $E_{nf}$ and $\varphi_{nf}$. Thus it is possible to separately measure the background cross term, which allows for removal of this term from the intensity result. As explained in the incorporated references, the tip scattering terms are dependent on the optical properties of the sample in the region immediately surrounding the tip. For example, it is possible to use measurements of the near field scattered light terms to create representations of optical properties like absorption, reflection, real/imaginary index of refraction (n,k), real/imaginary dielectric constant, real/imaginary permittivity, real/imaginary polarizability and other related optical properties. These measurements can be far more accurate once the impact of the uncontrolled background is suppressed. It is also possible to perform chemical analysis since the optical properties (like absorption) at a given illumination wavelength may be material composition dependent. Measurements of an optical property as a function of wavelength (or equivalently optical frequency or wavenumber), can be used to generate a spectrum, e.g. an absorption spectrum, that can be used to chemically characterize and/or identify an unknown material. Measurement of the near-field scattering as a function of wavelength also provides extremely useful information about other materials in plasmonic and photonics devices and materials as well. Measuring near-field scattering as a function of position can provide a map of the chemical composition of a sample and reveal the distribution of different chemical species.

Moreover, separately measuring the background according to various embodiments may also allow for rapid material composition sensitive imaging, because as will be shown, in some embodiments, background reduced tip scattering measurements may be made at one substantially constant reference phase, i.e. at one reference mirror position without the need to rapidly modulate the mirror and/or perform complicated sideband demodulation.

Figure 3:
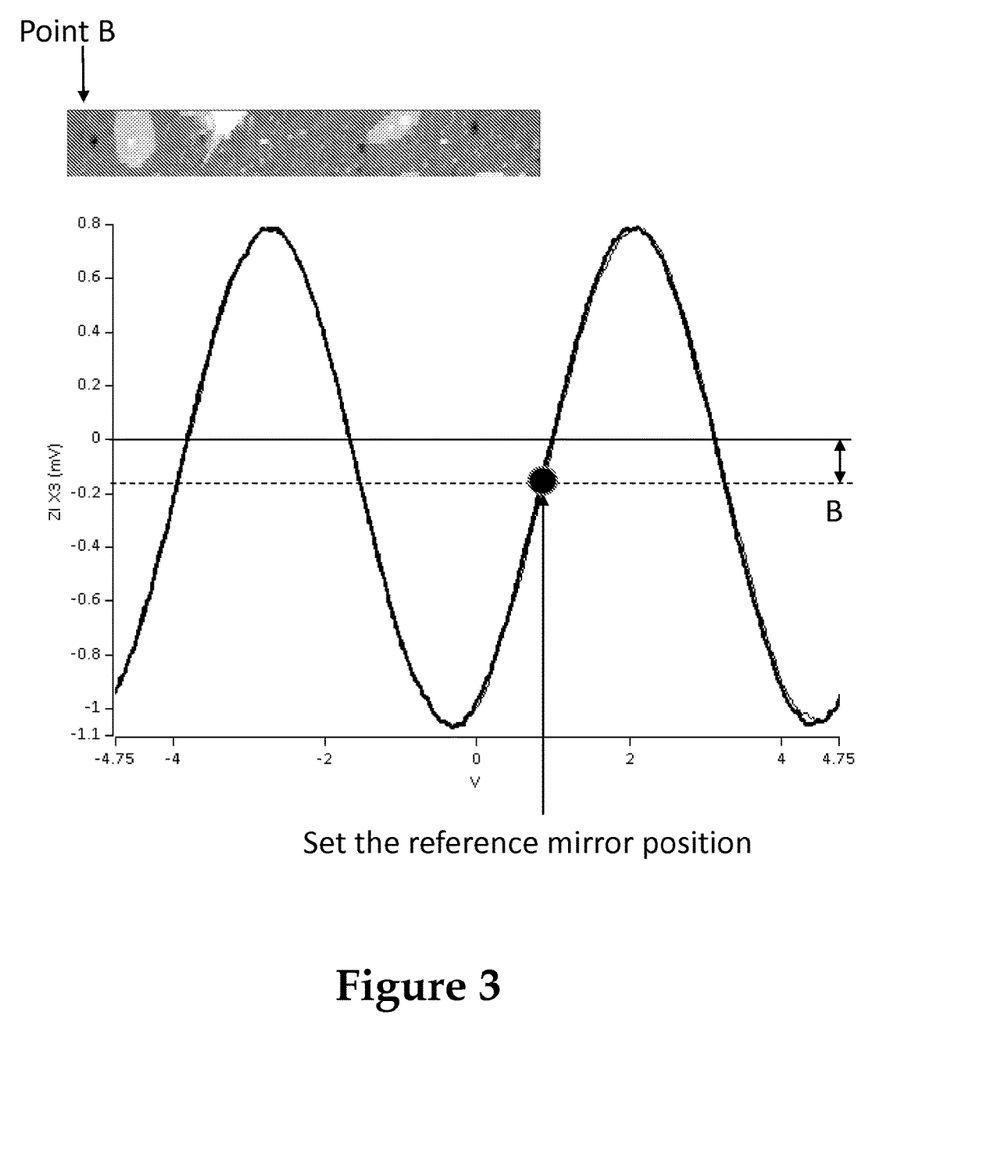
FIG. 3 illustrates the measurement of the probe-sample signal and the background signal, and determination of a reference mirror position, according to an illustrative embodiment.

The substantially constant reference phase can be set by measuring an interferogram on a reference region of a sample, for example as indicated by point B in FIG. 3. The interferogram is measured by collecting scattered light with an optical detector and then measuring an amplitude of the light scattered while sweeping the reference mirror through a series of reference phase positions. The amplitude of scattered light that is measured is usually the amplitude of scattered light at a higher harmonic of the cantilever oscillation frequency, i.e. the amplitude at $nf_0$, where $f_0$ is the oscillation frequency of the cantilever and n is an integer generally two or larger. This amplitude can be measured with an analog or digital lock-in amplifier, by extracting an amplitude at a desired frequency from a fast Fourier transform or similar mathematical analysis, a discrete Fourier sum, via a bandpass filter, or any other means that provides a signal indicative of an amplitude of the scattered light at a desired frequency. The resulting interferogram as shown in FIG. 3 will have a generally sinusoidal appearance as the adjustable reference phase passes through constructive and destructive interference with the scattered light. Note, however, that in the presence of background scattered light, the sinusoid is not centered around the origin of the y-axis. In practice there is an offset that represents the background/near field crossterm $2E_{nf}E_{bg} \cos (\varphi_{nf} - \varphi_{bg})$. This term does not depend on the reference phase and therefore provides a fixed DC level as the reference phase $\varphi_{ref}$ is adjusted.

As mentioned previously, it is desirable to measure the near-field scattered light at a plurality of positions on the sample with a substantially constant reference phase. The substantially constant reference phase can be determined in a variety of ways, as described below. First, the probe tip is moved to a reference region of the sample, ideally, but not necessarily in the positionable range of the SPM scanning mechanism or scanner. An example reference point is showed as reference point B in FIG. 3. The reference region in some embodiments may be a region of flat or known spectral response, for instance a region of gold or silicon or other suitable material. The reference region may be a region of a sample under study or it may be a separate sample intended specifically for reference measurements. An interferogram is acquired as shown in FIG. 3 by measuring a signal indicative of the detected light as a function of reference phase, typically by cycling the interferometer through a full cycle or a few cycles. Note that the interferogram shown in FIG. 3 plots a lock-in amplifier X signal or in phase (I) signal. It is alternately possible to measure and plot any other lock-in channel, for example quadrature signal Y or Q, or the lockin amplitude R or any other similar signal that is indicative of an amplitude of light detected at a desired frequency or within a range of frequencies. As mentioned elsewhere, it is also not necessary to use a lock-in as many other methods exist for determining a signal within a given frequency band, and any of these approaches may be used as the signal plotted in the interferogram. For some embodiments the interferogram is accomplished by moving the reference mirror in a linear fashion such as applying a ramp or sawtooth control signal to the mirror actuator. Of course other phase control devices than mirrors may be employed, for example a rotating retroreflector or a variable thickness piece of a retarding material. The desired reference phase to be used as the substantially constant reference phase may be selected from the interferogram in a number of ways. For some embodiments, the reference mirror position is chosen at the point that generally corresponds to a point where the interferogram amplitude is at the midpoint between its minimum and maximum excursions. Note that this is not generally at the zero point on the y-axis, because the interferogram may be shifted due to the non-zero background crossterm. This point can be obtained by measuring the peak to peak excursion of the inteferogram and calculating the midpoint. The substantially constant reference phase can also be selected by determining the average value of the interferogram over an integer number of sinusoidal periods. It can also be obtained by performing a curve fit to the interferogram. For example a function comprising a sinusoid and a variable offset can be fit to the interferogram and the DC offset can be extracted as a fit parameter. Note that in the case I, Q, X, Y and similar signed signals, the interferogram may have both positive and negative values. In the case of using the lock-in R signal, the interferogram will be rectified comprising a double humped pattern with one sinusoidal peak larger than the other. All of the above mentioned calculations can be performed on the rectified interferograms with appropriate simple modifications to account for the rectification. These modified calculations performed on a rectified interferogram may be considered equivalent to those performed on an unrectified interferogram.

Once the DC offset is known, the substantially constant reference phase position can be selected as a point where the interferogram curve crosses the DC offset value, i.e. the dashed horizontal line in FIG. 3. This is equivalent to setting the term $(\varphi_{nf} - \varphi_{ref})$ equal to $(2m+1)\pi/2$, where m is an integer. At these values, the reference/near field cross-term $2E_{nf}E_{ref} \cos (\varphi_{nf} - \varphi_{ref})$ is zero. It can be shown that the scattered light signal $I_s$—in the absence of a background signal—has the following form:

$$I_s \propto (Re\{\alpha_{eff}\} + A \cos(\phi))^2 + (Im\{\alpha_{eff}\} + A \sin(\phi))^2$$

where $\alpha_{eff}$ is the effective polarizability of the sample, A is the amplitude of the reference light and the phase $\phi$ is the relative reference phase. (See for example Xu et al (J. Phys. Chem. A, 2013, 117 (16), pp 3348-3354, which is incorporated by reference). In this formulation, when the phase term $\phi = \varphi_{nf} - \varphi_{ref} = (2m+1)\pi/2$, the scattered signal is proportional to:

$$A^2 + Re\{\alpha_{eff}\}^2 + Im\{\alpha_{eff}\}^2 + 2A*Im(\alpha_{eff}).$$

The constant $A^2$ term is easily discarded via lock-in detection at a harmonic frequency of the cantilever oscillation. Further the reference field A is selected to be much larger than the real or imaginary part of $\alpha_{eff}$, then the remaining signal is substantially proportional to $Im(\alpha_{eff})$. In this case, the s-SNOM scattered signal will be sensitive to the absorptive/dissipative properties of the sample, e.g. optical absorption in the sample, indicative of the absorption coefficient or imaginary index of refraction. So once the background crossterm is subtracted, the value of the s-SNOM signal will be zero at this selected reference phase on a reference region of the sample. Then, when measurements are performed on regions of interest on the sample (i.e. away from the reference region), any non-zero amplitude of the s-SNOM amplitude signal will be substantially indicative of an optical absorption in the sample, i.e. indicative of the absorption coefficient or imaginary index of refraction. It is an important improvement to account for a background scattered light term $2E_{nf}E_{bg} \cos (\varphi_{nf} - \varphi_{bg})$. This term can be very significant, and when not accounted for can introduce large errors where the scattered terms have contributions from both $Re\{\alpha_{eff}\}$ and $Im\{\alpha_{eff}\}$ at the phase value of $\phi = \varphi_{nf} - \varphi_{ref} = (2m+1)\pi/2$. Greatly improved accuracy measurements of $Im\{\alpha_{eff}\}$ may be made after an accurate subtraction of background crossterm $2E_{nf}E_{bg} \cos (\varphi_{nf} - \varphi_{bg})$ as described above.

Alternately, the reference phase can be selected such that the sinusoid is at maximum or minimum values. This is equivalent to setting the term $\phi = \varphi_{nf} - \varphi_{ref} = m\pi$ where m is an integer. At this reference phase the s-SNOM amplitude (after removal off the background term and $A^2$ term), the scattered light signal is proportional to:

$$Re\{\alpha_{eff}\}^2 + Im\{\alpha_{eff}\}^2 + 2A*Re\{\alpha_{eff}\}$$

Again in the limit where A is larger than $Re\{\alpha_{eff}\}$ and $Im\{\alpha_{eff}\}$, the scattered light signal is substantially indicative of the real portion of $\alpha_{\it eff}$, i.e. indicative of the real index of refraction of the sample. Using the background removal technique of disclosed embodiments and measurements at a substantially constant and appropriately selected reference phase, it is possible to construct orthogonal and unmixed measurements of complex optical properties of sub-micron regions of a sample. This enables separate measurements of both real and imaginary optical properties, e.g. real and imaginary dielectric properties, real and imaginary index of refraction, absorption and reflection coefficients and other related or derivative optical properties. The reference phase determination operation may be repeated a plurality of times, and/or a plurality of wavelengths, and/or at a plurality of locations, and the information may be averaged or otherwise processed to determine a working reference phase at a given wavelength.

This reference mirror position or other phase shifting device setting may be maintained during sample measurements thus causing the measurements to be made at substantially constant reference phase. The tip may be moved to regions of interest on the sample, one or more intensity measurements of the total signal made with the reference phase set at the predetermined value, i.e. in some embodiments at the predetermined reference mirror position, and then the reference arm removed, in some embodiments by swinging out or blocking the reference mirror or phase shifter, and the background contribution measured one or more times. Subtracting the background contribution measured/calculated from the total signal measured/calculated signal allows construction of an optical property/material composition dependent tip scattering signal with no background crossterm. This process may be repeated at a plurality locations on the sample, which may be used to produce an optical property/material composition dependent image of the sample surface. Because each measurement may be made at one reference phase, such optical property/material composition imaging may be accomplished much faster than techniques that rely on phase modulation or full or partial inteferograms for each measurement.

Spectral information may be accomplished by repeating the measurements, including the reference phase determination, at a plurality of illumination wavelengths.

Figure 4:
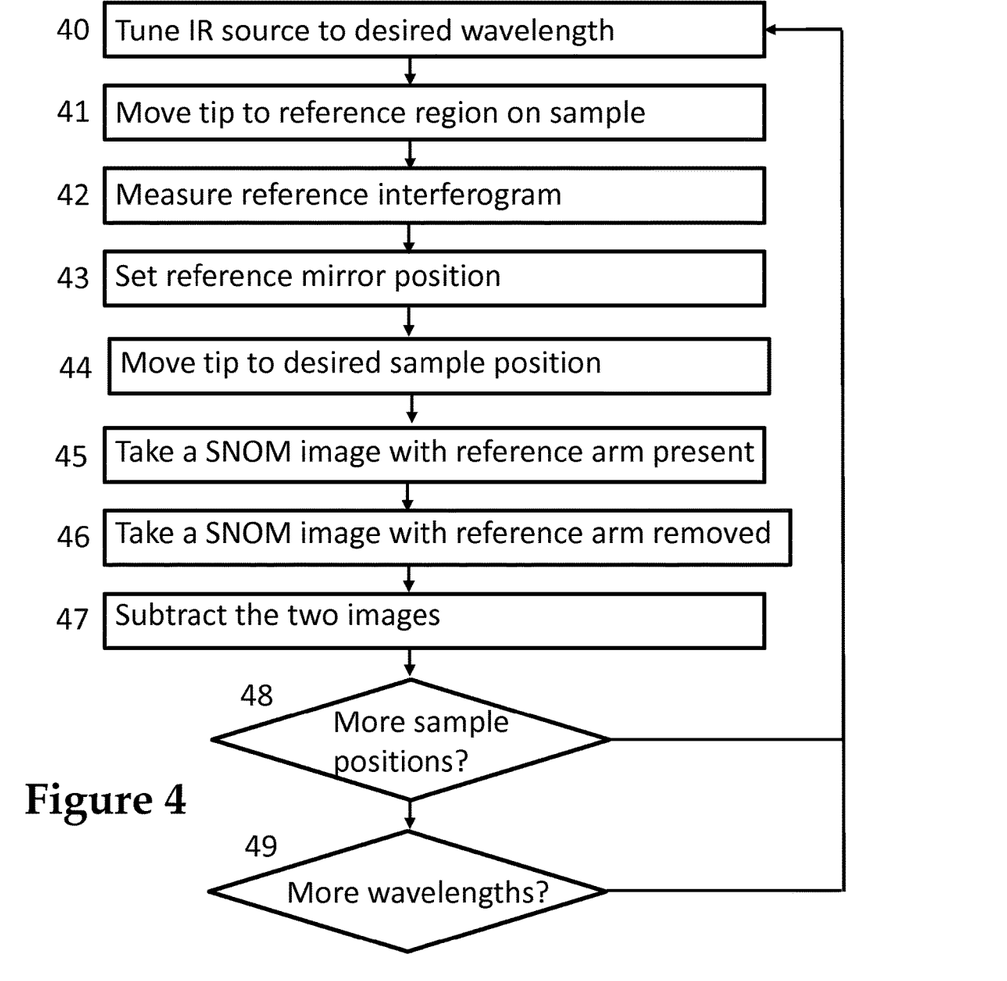
FIG. 4 is a flow chart of a method, according to an illustrative embodiment.

A flow chart of an illustrative method is shown in FIG. 4. In step 40, an IR source is tuned to a desired wavelength and this light is used to illuminate a region of the sample in the vicinity of the AFM tip. In step 41, the tip is moved to a reference region of the sample or a separate reference sample. Note that this may be achieved by moving the tip or the sample or a combination of both. In step 42 a reference interferogram is measured, as described above. In step 43, the reference mirror is moved to a desired position to maintain a substantially constant reference phase for step 45. Then in step 44, the tip is moved to a region of interest (typically different from the reference region of the sample). In step 45 and 46 s-SNOM measurements are performed under two conditions, one with the reference arm present and the reference phase at a substantially constant value and the other with the reference arm removed or blocked. Steps 45 and 46 can be acquired sequentially (i.e. one image after the other), or interleaved, i.e. alternating image lines with and without the reference arm present. In the case of sequential measurements these images can also be obtained in any order. In step 47, an s-SNOM image with background effects substantially suppressed can be constructed by subtracting the two images obtained in steps 45 and 46. For example, the background image in step 46 can be subtracted from the background plus signal image in step 45. This measurement can be repeated at any number of different positions on the sample (step 48) and/or wavelengths (step 49).

Figure 5A:
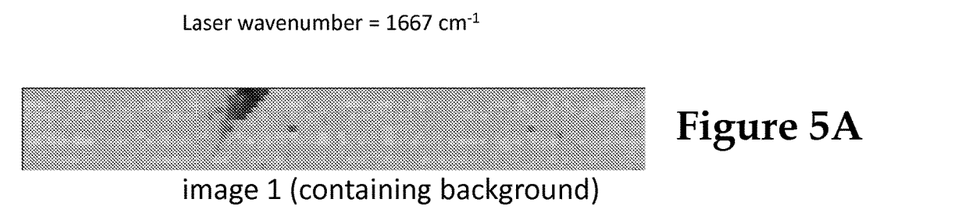
FIGS. 5A, 5B, and 5C show probe-sample interaction with background data, background only data and background corrected data.
Figure 5B:
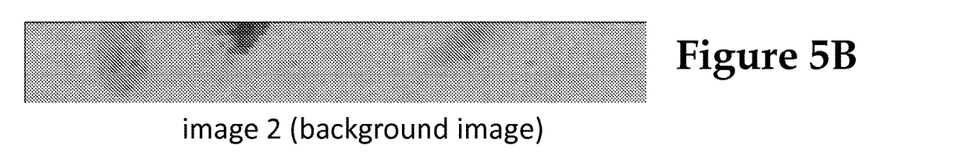
Figure 5C:
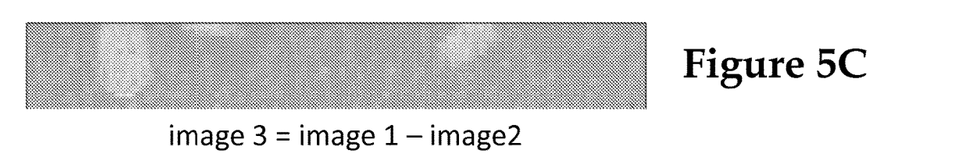
Figure 6A:
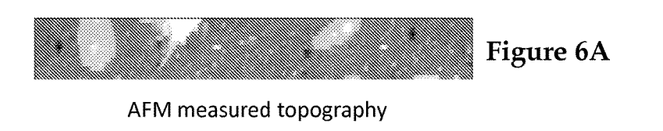
FIGS. 6A, 6B, 6C, 6D, and 6E show topography data along with probe-sample interaction with background data, background only data and background corrected data of the same region of a sample acquired at different illumination wavelengths.
Figure 6B:
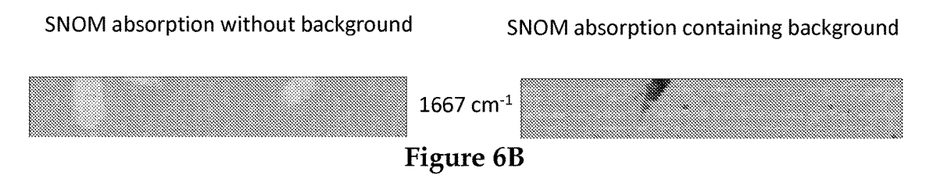
Figure 6C:
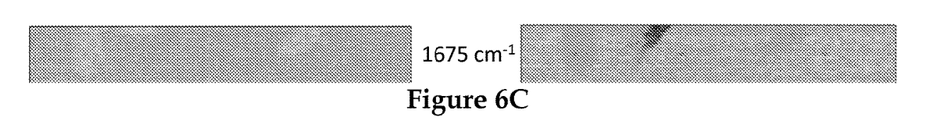
Figure 6D:
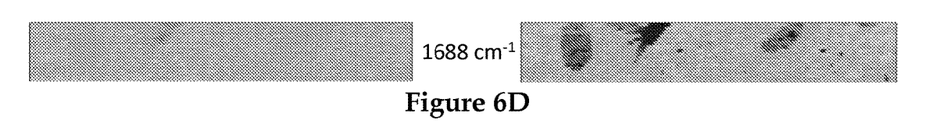
Figure 6E:
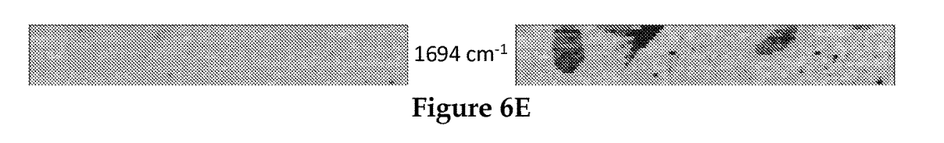

FIGS. 5A, 5B and 5C show an example of the construction of a background suppressed s-SNOM measurement. FIG. 5A shows an s-SNOM measurement of a biological membrane, specifically the purple membrane of the halobateria family. The measurement was obtained at 1667 cm$^{-1}$ with the reference phase at a substantially constant value, selected according to the methods described above and indicated in FIG. 3. The image in FIG. 5A contains both signal and unwanted background contributions. FIG. 5B shows a measurement performed with the reference arm blocked and is indicative of the crossterm between the background and the nearfield scattered light. FIG. 5C shows the construction of a background suppressed image, where the image in FIG. 5B is subtracted from FIG. 5A.

In FIGS. 6A-E, this process is shown repeated at a plurality of wavelengths or equivalently a plurality of optical frequencies or wavenumbers. The images in FIGS. 6A-E show measurements at a reference phase selected to highlight the imaginary portion of the optical response, i.e. the absorption, i.e. with a reference phase of $\phi=\varphi_{nf}-\varphi_{ref}=(2m+1)\pi/2$. The left column of images in FIGS. 6A-E show measurements made where the background has been suppressed by subtracting background images obtained with the reference arm blocked. The images in the right column show measurements obtained at the same reference phase, but without the background removal. The images in the left column show the expected absorptive behavior, i.e. that the absorption signal is highest at 1667 cm$^{-1}$, corresponding to the amide absorption band in the biological membrane, and then decreases away from this absorption band. The images in the right column, however, without the background effects removed, do not show the expected absorptive behavior. As such, images obtained at a fixed reference phase, but without background removal contain an unwanted mixing of real and imaginary optical properties. Combining the background removal with the measurement at a substantially fixed reference phase enables separate and/or orthogonal measurements of the complex optical properties of the sample without cross-contamination between real and imaginary optical properties.

Figure 7:
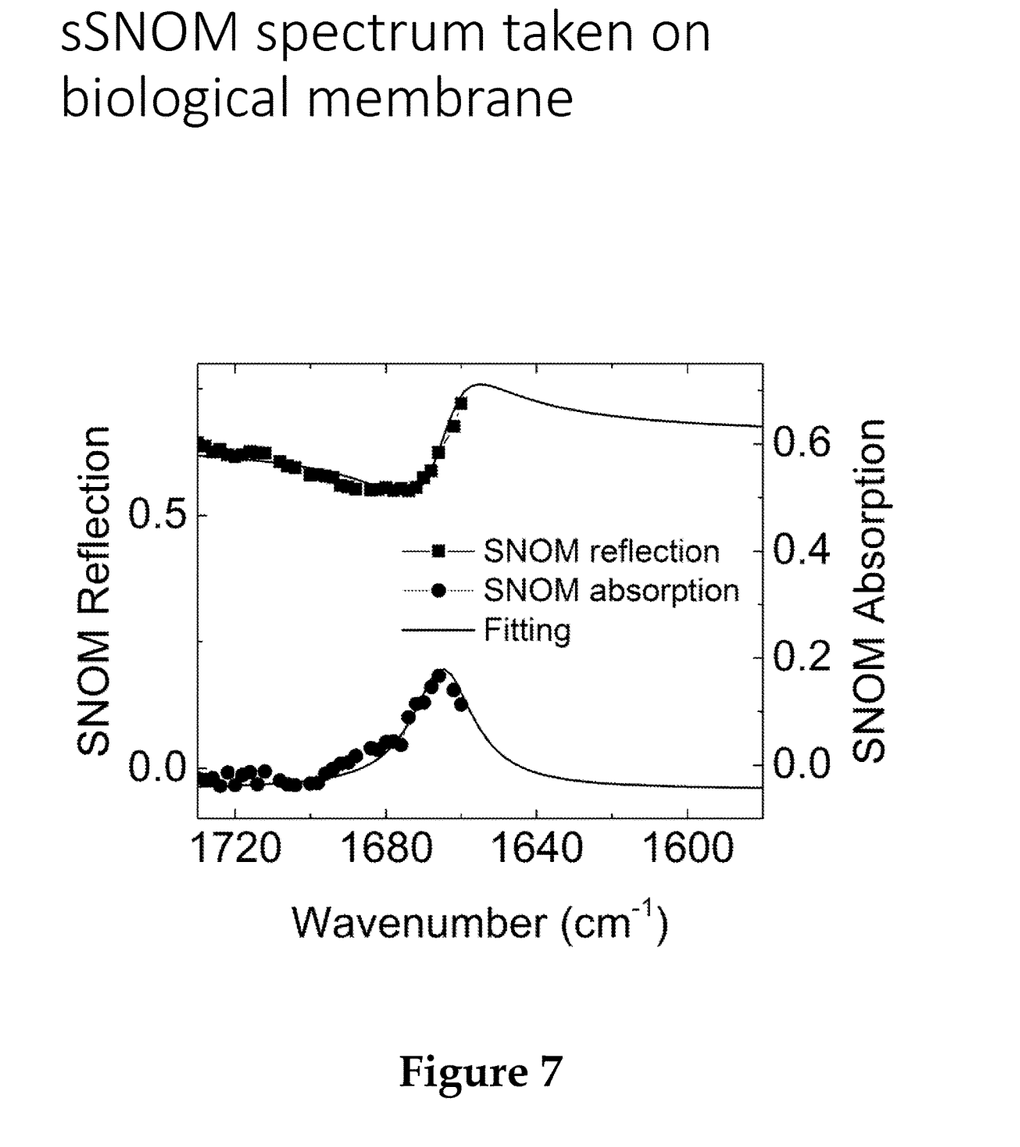
FIG. 7 illustrates a sSNOM spectrum acquired using various embodiments.

FIG. 7 shows an example of using an embodiment of the current invention to perform spectroscopic measurements. In this case, images were obtained at a plurality of different wavelengths according to the method illustrated shown in FIGS. 4-6. These images were analyzed to obtain signals indicative of the reflection and absorption spectra of the sample being studied, in this case a biological membrane. The spectra were created in this case by acquiring images at two successive substantially constant reference phase, a first reference phase to highlight the absorptive properties of the sample and a second reference phase to highlight the dispersive properties of the sample.

The embodiments described herein are exemplary. Modifications, rearrangements, substitute processes, alternative elements, etc. may be made to these embodiments and still be encompassed within the teachings set forth herein. One or more of the steps, processes, or methods described herein may be carried out by one or more processing and/or digital devices, suitably programmed.

Depending on the embodiment, certain acts, events, or functions of any of the method steps described herein can be performed in a different sequence, can be added, merged, or left out altogether (e.g., not all described acts or events are necessary for the practice of the algorithm). Moreover, in certain embodiments, acts or events can be performed concurrently, rather than sequentially.

The various illustrative logical blocks, optical and SPM control elements, and method steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or methods illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

The invention claimed is:

1. A method of measuring an optical property of a sub micrometer region of a sample comprising the steps of:
   interacting a probe tip of a probe microscope with a region of the sample;
   illuminating the sample with a beam of light from a radiation source such that light is scattered from the probe-sample interaction region;
   interfering a reference beam with the scattered light wherein the reference beam has an adjustable optical phase;
   measuring with a detector at least a portion of the light scattered from the probe-sample and background regions with the reference beam fixed at one substantially constant reference phase to generate a measured image;
   capturing detector signals with no reference beam interference to generate an image indicative of a crossterm between scattered near field radiation and background scattered radiation; and
   constructing a background suppressed image indicative of the optical property of the sample by subtracting the crossterm image from the measured image at the substantially constant reference phase, wherein contributions from background scattered light are substantially suppressed.

2. The method of claim 1 wherein the method is repeated at a plurality of probe positions on the sample.

3. The method of claim 1 further comprising the step of measuring an amplitude of light collected by the detector as a function of adjustable reference phase to create an interferogram and using the interferogram to select the substantially constant reference phase.

4. The method of claim 3 wherein the reference phase is selected to be a value of the adjustable phase wherein the interferogram amplitude substantially corresponds to a background amplitude of scattered light measured without a reference beam present.

5. The method of claim 3 wherein the reference phase is selected to be a value of the adjustable phase wherein the interferogram amplitude substantially corresponds to a midpoint between maximum and minimum values of the interferogram.

6. The method of claim 3 wherein the reference phase is selected to be a value of the adjustable phase wherein the interferogram amplitude substantially corresponds to an average value of the interferogram over an integral number of interferogram periods.

7. The method of claim 3 wherein the reference phase is selected to be a value of the adjustable phase wherein the interferogram has substantially a maximum slope.

8. The method of claim 3 wherein the reference phase is selected to have a value substantially equal to $(2m+1)\pi/2$ where m is an integer.

9. The method of claim 3 wherein the reference phase is selected to have a value substantially equal to $m\pi$ where m is an integer.

10. The method of claim 1 wherein the reference phase is measured on a reference region of a sample, wherein the reference region has a known or substantially constant scattering response.

11. The method of claim 10 wherein the reference region is within a positionable range of the probe.

12. The method of claim 1, wherein the method is performed at a plurality of probe positions on the sample.

13. The method of claim 12, wherein a background suppressed image of an optical property of the sample is created by subtracting amplitudes of detector signals obtained with no reference beam from amplitudes of detector signals obtained with the reference beam at the substantially constant reference phase.

14. The method of claim 1 wherein the method is performed at a plurality of source wavelengths.

15. The method of claim 1 wherein the optical property comprises at least one of absorption, reflection, real/imaginary index of refraction (n,k), real/imaginary dielectric constant, real/imaginary permittivity, and real/imaginary polarizability.

16. A method of measuring an optical property of a sub micrometer region of a sample comprising the steps of:
    interacting a probe tip of the probe microscope with a region of the sample;
    illuminating the sample with a beam of light from a radiation source such that light is scattered from the probe-sample interaction region and also scattered from background regions;
    interfering a reference beam with the probe-sample and background scattered light wherein the reference beam has an adjustable optical phase;
    creating an interferogram of an amplitude of detector signals as a function of optical phase to determine a single reference phase;
    measuring with a detector at least a portion of the light scattered from probe-sample and background regions at a single substantially constant value corresponding to the single determined reference phase to generate a measured image;
    measuring detector signals with the reference beam being blocked to generate an image indicative of a crossterm between scattered near field radiation and background scattered radiation; and
    subtracting the crossterm image from the measured image with the detector signals with the reference beam at the reference phase to construct a background suppressed image indicative of the optical property of the sample wherein contributions from the background scattered light are suppressed.

17. The method of claim 16 wherein the method is performed at a plurality of probe positions on the sample to construct an image of the optical property.

18. A sample analysis system comprising;
    a probe microscope with a probe tip configured to interact with a region of the sample;
    a radiation source configured to illuminate the sample with a beam of light from a radiation source such that light is scattered from the probe-sample interaction region;
    an interferometer configured to interfere the light scattered from the illuminated tip region with a reference beam of adjustable optical phase;
    a detector configured to measure at least a portion of the scattered light scattered from the probe sample interaction region and background regions with the reference beam fixed at one substantially constant reference phase to generate a measured image;
    wherein said system is configured to construct a background suppressed image indicative of an optical property of the sample wherein contributions from background scattered light are substantially suppressed,
    wherein the detector is configured to measure tip-sample scattered light with no reference beam interference to generate a crossterm image between scattered near field radiation and background scattered radiation, and
    wherein the contributions from background scattered light are substantially suppressed by subtracting the crossterm image from the measured image at the predetermined reference phase for constructing the background suppressed image.

19. The system of claim 18 wherein the signal indicative of an optical property is constructed at a plurality of positions on the sample.

20. The system of claim 18 wherein the reference phase is determined by analyzing the detector signals at a point on the sample by comparing the signals with the reference beam present to signals with the reference beam removed.

21. The system of claim 18 wherein the reference phase is selected to have a value substantially equal to $(2m+1)\pi/2$ where m is an integer.

22. The system of claim 18 wherein the reference phase is selected to have a value substantially equal to $m\pi$ where m is an integer.

23. The system of claim 18, wherein the system is configured to;

move the reference mirror, in a pattern to create an interferogram covering at least one full phase cycle and capturing the detector signal representative of the interferogram;

capture the background signal with the reference beam removed;

determine the reference mirror position (phase) where the interferogram intersects, on the rise, the background signal; and use that reference mirror position as the substantially constant reference phase.

24. The system of claim 18 wherein the optical property comprises at least one of absorption coefficient, reflection, real index of refraction (n), imaginary index of refraction (k), real dielectric constant, and imaginary dielectric constant.

\* \* \* \* \*